US007418303B2

(12) United States Patent
van de Ligt et al.

(10) Patent No.: US 7,418,303 B2
(45) Date of Patent: *Aug. 26, 2008

(54) SYSTEM FOR AND METHOD OF CUSTOMIZING AN ANIMAL FEED BASED ON NUCLEIC ACID MATERIAL CONTENT

(75) Inventors: Christiaan P. A. van de Ligt, Elk River, MN (US); Mark D. Newcomb, Independence, MN (US); W. Michael Craig, Monticello, MN (US); David A. Cook, Coon Rapids, MN (US)

(73) Assignee: CAN Technologies, Minnetonka, MN (US)

( * ) Notice: Subject to any disclaimer, the term of this patent is extended or adjusted under 35 U.S.C. 154(b) by 1160 days.

This patent is subject to a terminal disclaimer.

(21) Appl. No.: 10/656,990

(22) Filed: Sep. 5, 2003

(65) Prior Publication Data
US 2004/0122597 A1 Jun. 24, 2004

Related U.S. Application Data

(63) Continuation of application No. 10/175,512, filed on Jun. 19, 2002, now Pat. No. 6,658,308.

(51) Int. Cl.
*G06F 19/00* (2006.01)
*G01V 3/00* (2006.01)
*G01V 7/00* (2006.01)

(52) U.S. Cl. .................. 700/90; 700/91; 700/92; 702/2; 702/22; 119/51.01

(58) Field of Classification Search .......... 700/90–92, 700/106; 119/51.01, 51.02, 53; 702/2, 22, 702/179
See application file for complete search history.

(56) References Cited

U.S. PATENT DOCUMENTS

| 4,712,511 A | 12/1987 | Zamzow et al. |
| 5,105,767 A | 4/1992 | Gordon et al. |
| 5,309,864 A | 5/1994 | Harmsen et al. |
| 5,355,833 A | 10/1994 | Legrain |
| 5,478,989 A | 12/1995 | Shepley |

(Continued)

FOREIGN PATENT DOCUMENTS

EP 0 715 806 A1 6/1996

(Continued)

OTHER PUBLICATIONS

Carver et al., "The Role Of Nucleotides In Human Nutrition," Nutritional Biochemistry, 1995, vol. 6, February pp. 58-72.

(Continued)

*Primary Examiner*—M. N. Von Buhr
(74) *Attorney, Agent, or Firm*—Cargill Incorporated

(57) ABSTRACT

A system for and method of determining a formulation for an animal feed having a customized nucleic acid material content. The system can include an animal profile, an animal nutrient requirement profile, an evaluation criteria, and/or ingredient nutrient content profiles. The information contained in the profiles and criteria can be used to calculate a formulation having a desirable nucleic acid material content. The optimized nucleic acid material content can be used to maximize satisfaction of an evaluation criteria.

23 Claims, 2 Drawing Sheets

U.S. PATENT DOCUMENTS

| | | | |
|---|---|---|---|
| 5,668,718 A | | 9/1997 | Liu et al. |
| 5,673,647 A | * | 10/1997 | Pratt ....................... 119/51.02 |
| 5,700,590 A | | 12/1997 | Masor et al. |
| 5,816,191 A | | 10/1998 | Beaudoin et al. |
| 6,000,361 A | * | 12/1999 | Pratt ....................... 119/51.02 |
| 6,076,043 A | | 6/2000 | Liu |
| 6,115,692 A | | 9/2000 | Liu et al. |
| 6,135,055 A | | 10/2000 | Pratt |
| 6,200,210 B1 | * | 3/2001 | Pratt ........................... 452/52 |
| 6,318,289 B1 | * | 11/2001 | Pratt ....................... 119/51.02 |
| 6,358,546 B1 | * | 3/2002 | Bebiak et al. ............... 426/232 |
| 2001/0044579 A1 | * | 11/2001 | Pratt ........................... 600/437 |
| 2002/0050248 A1 | * | 5/2002 | Pratt ....................... 119/51.02 |
| 2002/0081356 A1 | * | 6/2002 | Bebiak et al. ............... 426/232 |
| 2002/0120402 A1 | * | 8/2002 | Burghardi et al. ............. 702/19 |
| 2003/0188689 A1 | * | 10/2003 | Pratt ....................... 119/51.02 |
| 2004/0098209 A1 | * | 5/2004 | Burghardi et al. ............. 702/32 |

FOREIGN PATENT DOCUMENTS

| | | |
|---|---|---|
| WO | WO 00/41575 | 7/2000 |
| WO | WO 02/47473 A2 | 6/2002 |

OTHER PUBLICATIONS

Bernard Devresse, "Nutrient Levels In Some Commercial Shrimp Feeds And Feed Ingredients Of Asia And Latin America—A Comparative Analysis," Inve Aquaculture N.V.Oeverstraat, 7 B-9200 Belgium, pp. 49-70, no date.

J. P. F. D'Mello, "Utilization Of Dietary Purines And Pyrimidines By Non-Ruminant Animals," Proc. Nutr. Soc. (1982), 41, pp. 301-308.

Michael Howie, "Condensed Porcine Solubles Suitable Source Of Energy, Protein For Swine," Feedstuffs, Oct. 26, 1998, The Miller Publishing Company, a company of Rural Press Ltd.

Karasawa et al., "Effect of Dietary RNA On Growth And Food Intake Of Young Chicks," Japanese Poultry Science, 2 (3), 1990, pp. 165-172.

Kubota et al., "Adverse Effects Of Low Concentrations Of Dietary RNA Addition On The Growth, Food Intake And Kidney Weight Of Young Chickens," British Poultry Science (1994) 35: pp. 585-588.

Kulkarni et al., "The Role Of Dietary Sources Of Nucleotides In Immune Function: A Review," Symposium: Dietary Nucleotides: A Recently Demonstrated Requirement for Cellular Development and Immune Function, given at the Experimental Biology '93 meeting, New Orleans, LA, Mar. 31, 1993.

"Orotate Supplementation For Starter Diet For Swine," Nutri-Quest, Inc., 1400 Elbridge Payne Road, Chesterfield, MO 63017, no date.

Rudolph et al., "Role Of RNA As A Dietary Source Of Pyrimidines And Purines In Immune Function," Nutrition, vol. 6, No. 1, Jan./Feb. 1990, pp. 45-52.

Tsujinaka et al., "Role Of Supplementation Of A Nucleic Acid Solution On The Intestinal Mucosa Under Total Parenteral Nutrition," Nutrition, vol. 13, No. 4, 1997, pp. 369-371.

"What's All This Noise About Nucleotides?," Feeding Times, vol. 6, No. 2, 2001, pp. 18-19.

Schematic representation of computer system commercially used by Cargill, Inc. prior to Dec. 1999, 1 page (Nutrient Gap Flowchart).

Schematic representation of computer system commercially used by Cargill, Inc. prior to Jun. 2001, 3 pages, (Figures 1-3 from WO 02/47473).

Derwent Abstract of SU 843 889; Accession No. 1982-E5977E.

Derwent Abstract of EP 0715 806 A1; Accession No. 1996-260514.

PCT International Search Report for International Application No. PCT/US03/19086, Jun. 28, 2004, (4 pgs.).

* cited by examiner

SYSTEM FOR AND METHOD OF CUSTOMIZING AN ANIMAL FEED BASED ON NUCLEIC ACID MATERIAL CONTENT

FIELD OF THE INVENTION

The present invention relates generally to a computerized system for determining a customized feed for animals, such as cattle, swine, poultry, fish, crustaceans and the like. More particularly, the present invention relates to determining a feed mix that includes a nucleic acid material content based upon animal needs and/or characteristics, available ingredients and cost of production.

BACKGROUND OF THE INVENTION

In general, animal feed products are compositions of a large variety of raw materials or ingredients. The ingredients can be selected to optimize the amount of any given nutrient or combination of nutrients in an animal feed product based upon the nutrient composition of the ingredients used.

The nutritional composition of any one feed ingredient can be used in combination with the nutritional composition of every other ingredient in the feed to produce an animal feed that maximizes an evaluation criteria. One example of an evaluation criteria is the growth and production rate of the animal in the shortest amount of time. Animal feed producers have recognized that certain nutritional compositions help animals to meet or exceed evaluation criteria than if they used other nutritional compositions. For example, a particular cow feed composition can be made that will deliver an improved balance of essential amino acids post ruminally. This has been shown to have the effect of increasing the cow's milk production. Maximizing the speed and frequency with which animals meet the evaluation criteria generally is desirable. Maximizing criteria satisfaction also may include maximizing some positive criteria, such as total muscle gain, or minimizing a negative criteria, such as weight loss during illness.

A composition can be used in several forms: complete feed form, concentrate form, blender form and base mix form. An example of the complete feed form can include wheat middlings, corn, soybean meal, corn gluten meal, distillers grains or distillers grains with solubles, blood meal, salt, macro-minerals, trace minerals, and vitamins.

Further, animal feed producers have recognized that desirable nutritional composition changes depending on the developmental stage of the animal in question (e.g. newborn, weaning, gestating). The ideal nutrient composition can also change based on additional factors, including the health of the animal and whether the animal is nursing. Therefore, animal feed producers have recognized that by mixing ingredients to produce an ideal nutritional composition for particular animals at particular growth stages, they can meet evaluation criteria.

Thus, there is a need for a method and system for maximizing nutritional criteria satisfaction. Further, there is a need for a system and method to create a customized animal feed formulated to satisfy some requirement.

SUMMARY OF THE INVENTION

An exemplary embodiment is related to a system for determining customized feed for at least one animal. The system can include a first memory portion configured to store animal data representative of the characteristics of the animal, a second memory portion configured to store feed data representative of feed ingredients, and a data processing circuit in communication with the memory portions and configured to generate a nutritional profile including a desirable nucleic acid material content for the animal based upon the animal data. The data processing circuit can be further configured to generate formulation data representative of a combination of feed ingredients. The formulation data can be generated by the data processing circuit based upon the nutritional profile data and the feed data.

An exemplary embodiment is related to a system for determining customized feed for at least one animal. The system can include a first memory portion configured to store animal data representative of the characteristics of the animal, a second memory portion configured to store feed data representative of feed ingredients, a third memory portion configured to store evaluation data representative of at least one evaluation criteria, and a data processing circuit in communication with the memory portions and configured to generate a nutritional profile including a desirable nucleic acid material content for the animal based upon the animal data. The data processing circuit can be further configured to generate formulation data representative of a combination of feed ingredients. The formulation data can be generated by the data processing circuit based upon the nutritional profile data, the feed data and the evaluation data.

Another exemplary embodiment is related to a system for determining customized feed for at least one animal. The system includes a first memory means for storing animal data representative of the characteristics of the animal, a second memory means for storing feed data representative of feed ingredients, a third memory means for storing evaluation data representative of at least one evaluation criteria, and a processing means for generating nutritional profile data representative of a desirable nucleic acid material content for the animal based upon the animal data. The processing means can generate formulation data representative of a combination of feed ingredients. This formulation data can be generated based upon the nutritional profile data, the feed data and the evaluation data.

Another exemplary embodiment can be related to a method for determining customized feed for at least one animal. The method can include storing animal data representative of the characteristics of the animal, storing feed data representative of feed ingredients, generating nutritional profile data including a representation of a desirable nucleic acid material content for the animal based upon the animal data, and generating formulation data representative of a combination of feed ingredients. The formulation data can be generated based upon the nutritional profile data and the feed data.

Another exemplary embodiment can be related to a method for determining customized feed for at least one animal. The method can include storing animal data representative of the characteristics of the animal, storing feed data representative of feed ingredients, storing evaluation data representative of at least one evaluation criteria, generating nutritional profile data including a representation of a desirable nucleic acid material content for the animal based upon the animal data, and generating formulation data representative of a combination of feed ingredients. The formulation data can be generated based upon the nutritional profile data, the feed data, and the evaluation data.

Other principle features and advantages of the invention will become apparent to those skilled in the art upon review of the following drawings, the detailed description, and the appended claims.

BRIEF DESCRIPTION OF THE DRAWINGS

The exemplary embodiments will hereafter be described with reference to the accompanying drawings, wherein like numerals denote like elements, and.

DETAILED DESCRIPTION OF EXEMPLARY EMBODIMENTS

A system for and method of customizing nucleic acid material content in an animal feed are described. In the following description, for the purposes of explanation, numerous specific details are set forth in order to provide a thorough understanding of the present invention. It will be evident, however, to one skilled in the art that the exemplary embodiments may be practiced without these specific details. In other instances, structures and devices are shown in diagram form in order to facilitate description of the exemplary embodiments.

In at least one exemplary embodiment illustrated below, a computer system is described which has a central processing unit (CPU) that executes sequences of instructions contained in a memory. More specifically, execution of the sequences of instructions causes the CPU to perform steps, which are described below. The instructions may be loaded into a random access memory (RAM) for execution by the CPU from a read-only memory (ROM), a mass storage device, or some other persistent storage. In other embodiments, hardwired circuitry may be used in place of, or in combination with, software instructions to implement the functions described. Thus, the embodiments described herein are not limited to any particular source for the instructions executed by the computer system.

Figure 1:
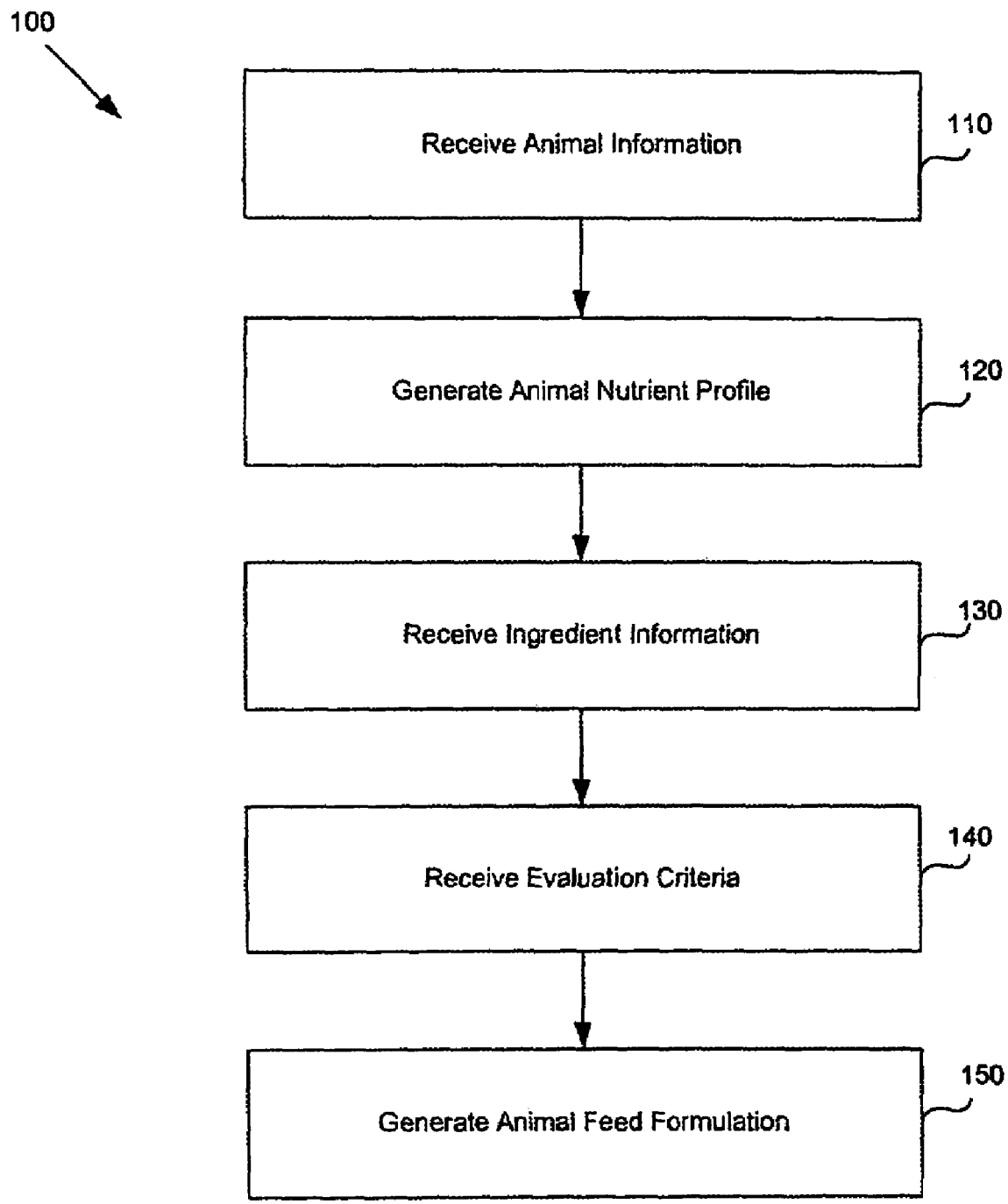
FIG. 1 is a flow chart, illustrating a method of formulating an animal feed having a customized nucleic acid material content.

FIG. 1 illustrates a flow diagram 100 depicting the steps in a method for customizing a nucleic acid material content in an animal feed. The nucleic acid material content in an animal feed can include an aggregate level of nucleic acid material materials, or levels of individual nucleic acid material materials. The nucleic acid material content in an animal feed refers to any parameter related to the aggregate level and/or relative amount of nucleic acid material or a subtype thereof in the feed.

As referred to herein, the term "nucleic acid material" includes nucleic acids, nucleotides, nucleosides, and/or nucleic acid-derived bases. Examples of suitable nucleotides include adenylic acid, guanylic acid, cytidylic acid, uridylic acid, inosinic acid, and/or the salts thereof. Examples of suitable nucleosides include guanosine, deoxyguanosine, adenosine, deoxyadenosine, cytidine, uridine, inosine and/or deoxyinosine. Examples of suitable bases of the structural components of nucleic acids include salts of guanine, cytosine, and/or adenine, e.g., hydrochloride salts of one or more of these purine and pyrimidine bases. The present animal feeds include nucleic acid material which may commonly contain the nucleotides, the nucleosides and/or the purine and pyrimidine bases of the structural component of nucleic acids. Mixtures of purine and pyrimidine bases, e.g., mixtures of AMP, GMP, UMP and CMP may be obtained by hydrolyzing ribonucleic acid (e.g., from a yeast) with 5'-phosphodiesterases into 5'-nucleotides. To obtain a mixture of IMP, GMP, UMP and CMP, the mixture of AMP, GMP, UMP and CMP may be treated with one or more deaminases.

The nucleic acid material content of an animal feed may be customized in terms of the total nucleic acid material content present in the feed. In some instances, however, it may be desirable to customize the nucleic acid material content based on the amounts and/or relative amounts of subtypes of nucleic acid material. Examples of parameters which may be used to customize an animal feed include the total amount of purines (e.g., as nucleic acids, nucleotides, nucleosides and/or purine bases); the total amount of pyrimidines (e.g., as nucleic acids, nucleotides, nucleosides and/or pyrimidine bases); the purine/pyrimidine ratio in the feed; the total amount of individual purines or pyrimidines (present as nucleic acids, nucleotides, nucleosides and/or bases); and the relative amounts of two or more individual purines or pyrimidines (present as nucleic acids, nucleotides, nucleosides and/or bases).

Animal feed ingredients have been identified that can be credited with a relatively high nucleic acid material value. These ingredients generally include animal, bacterial, and yeast products. All ingredients typically provided in animal feed can provide nucleic acid materials. However, specifically designed formulations can be used to intentionally control the nucleotide concentration provided in an animal feed as a method to modify animal performance.

An animal feed with a customized nucleic acid material content is applicable to all livestock, poultry, companion animals and aquaculture nutritional applications. For illustrative purpose, the method illustrated in FIG. 1 is described with reference to swine.

According to an exemplary embodiment, in a step 110, animal information is received. The animal information can include a type of animal, a production stage of the animal and a health state of the animal. Types of animals could include bovine, swine, various species of fish, etc. The production stage of the animal could include a weaning stage, a starter stage, a production stage, a gestating stage or any stage useful in delineating a group of animals with similar nutritional needs. The health of the animal could include healthy, ill, severely ill, etc.

According to an exemplary embodiment, the animal information can be received using a type of input device associated with a computer, such as a keyboard, a mouse, a voice recognition system, etc. An exemplary computing system is described with reference to FIG. 2. According to an alternative embodiment, the animal information can be received over a communication link, such as a computer network, a phone link, a fax line, standard mail, etc. An exemplary network configuration is described with reference to FIG. 3.

Animal information received in step 110 can be used to generate an animal nutrient requirement profile in a step 120. The animal nutrient requirement profile can include a listing of one or more of the following: proteins, amino acids, carbohydrates, fat, energy, vitamins, minerals and/or nucleic acid material requirements. Depending on the sophistication of the profile generation system, the listing can include a greater or fewer number of entries. For example, according to alternative embodiment, the listing can further include the fiber content. The listings may also vary according to the type of animal. According to an alternative embodiment, the animal nutrient requirement profile can include a range of values that represent desirable nutrient levels.

The animal nutrient requirement profile can be a listing of desirable nutrient levels for the animal described in the animal information. The ideal nutrient levels can include a desirable nucleic acid material content for the animal described in the animal information. An example can be a healthy, weaning pig nutrient profile which includes about 1-5% fat, 18-30% crude protein and about 3000-3500 kcal metabolizable energy. The nutrient profile can further include a requirement of at least 0.5 wt. % nucleic acid material and typically includes about 0.2-0.4 wt. % nucleic acid material in the diet to maximize growth.

The animal nutrient requirement profile may also include limiting values indicating that an animal feed should not contain more than a given level of a particular nutrient. Advantageously, a limiting value can be used to prevent excess utilization of nutrients that, at higher levels, may be growth limiting or even toxic.

In a step 130, ingredient information can be received. The ingredient information can be information related to ingredients to be used in formulation of the animal feed. The ingredient information can include a listing of ingredients available for use in production of an animal feed. The ingredient listing can be a listing of all available ingredients on a national market, a listing of ingredients available in a local market, a listing of ingredients available at a particular site, or any other set or subset of ingredients.

The ingredient information can further include additional information related to the available ingredients. The additional information can include the cost of the ingredient, the ingredient nutrient content profile of the ingredient, any limitations of the availability of the ingredient and any other related information. The cost of the ingredient can be normalized to account for any shipping, storage, or other overhead costs. The ingredient nutrient content profile can be a complete listing of all nutrient levels in an ingredient or a subset of the nutrient levels sufficient to make an analysis. The ingredient nutrient content profile of the ingredient can further include the amount of nucleic acid material present in the ingredient. The ingredient listing may vary according to the type of animal to include only ingredients that are used to feed that type of animal.

In a step 140, an evaluation criteria is received. The evaluation criteria may be chosen from a criteria related to animal productivity such as animal production rate (e.g. growth or rate of production of a food product such as milk or eggs), cost of feed per unit animal weight gain and feed weight per unit animal weight gain. The evaluation criteria can be a particular criteria that a producer would like to optimize. For example, a pork producer may wish to optimize rate of gain by selecting a feed which maximizes the rate at which a pig gains weight.

The evaluation criteria can include a single criteria or multiple criteria. If multiple criteria are provided, the criteria can be given weights designating their relative importance in a calculation. As an example, a producer may want to generate an animal feed that is weighted 70% on a animal production rate criteria and 30% on a cost of feed per unit animal weight gain basis.

The evaluation criteria can incorporate responses to the optimization of nucleic acid material content in an animal feed. Responses to nucleic acid materials can include immune activation/regulation, tissue growth, and tissue functioning.

Following the collection of data in step 110 through step 140, a processing step 150 can be performed. The processing step can be performed by a processing means. An exemplary processing means can be a computer as described with reference to FIG. 2. The processing step can use a linear program to generate a profile for an animal feed according to the evaluation criteria provided in step 140. A linear program can be a mathematical model capable of solving problems involving a large number of variables limited by constraints using linear math functions. A variety of different linear math programs capable of solving problems of this type are known to those of skill in the art. One example of a program of this type is commercially available from Format International of St. Louis, Mo. as part of a computer software system for solving complicated multivariable problems.

The linear program can further include functionality to account for different weights associated with multiple evaluation criteria. The incorporation of weighting information in a linear program is known to those of skill in the art.

A processing means which includes the linear program, described with reference to FIG. 2, can take input data (e.g. animal nutrient requirement profile, evaluation criteria, ingredient nutrient content profile, etc.) as a basis to compute animal feed data. Animal feed data can include data specifying a combination of ingredients solution which is solved to fulfill a desired animal nutrient requirement profile based on one or more evaluation criteria.

Advantageously, the method described with reference to FIG. 1 allows a producer to formulate an animal feed with an optimized nucleic acid material content. Advantageously, dietary nucleic acid materials are digested to nucleotides and nucleosides that are absorbed by the animal. These nucleotides and nucleosides can then be utilized (incorporated) in DNA and RNA of multiplying cells as well as RNA to regulate processes in established cells (e.g., gene expression level). Utilizing absorbed nucleic acid materials is more efficient than de novo synthesis of nucleic acid materials or part thereof. Energy and amino acids are spared when absorbed nucleic acid materials are utilized; either as nucleosides, nucleotides, purines, or pyrimidines in phosphorylated and non-phosphorilated form. Moreover, de novo synthesis of nucleic acid materials may limit the growth rate of an animal. Absorbed nucleotides and nucleosides still maintain a ribose-purine/pyrimidine structure that is believed to be the heart of the responses observed.

The utilization of nucleic acid materials in swine diets can improve performance when the animal has a high rate of cell (re)generation or increased need of gene expression (need for nutrient transporters). A high rate of get cell (re)generation and/or increased need of gene expression usually occurs in association with high tissue growth rates. High tissure growth rates can occur, for example, after intestinal villi atrophy due to a severely reduced feed intake, after changes in nutrient supply that depend on transporter mechanisms, and/or during peak growth periods. High tissue growth rates are generally related to weaning stress in piglets, lactating of sows, after or during an intestinal infection/irritation and/or during periods of rapid growth. Responses in animal performance are also expected during rapid growth of the intestinal tract, muscle, fetal, and mammary development.

Potential performance improvements may be dependent on the production stage of the animals. Improved gain, feed intake and feed efficiency are expected in nursery and finishing pigs. Mature animals (sows and boars) would show improved feed efficiency and condition after a challenge. Gestating and lactating sows can show improved feed efficiency, gain, and reproductive characteristics. Reproductive characteristics are increased pigs/litter birth weight, litter growth rate, litter weaning weight, pig weaned/litter/sow, and sow body weight at weaning and reduced days to first estrous and days weaning to gestation for the sow.

Figure 2:
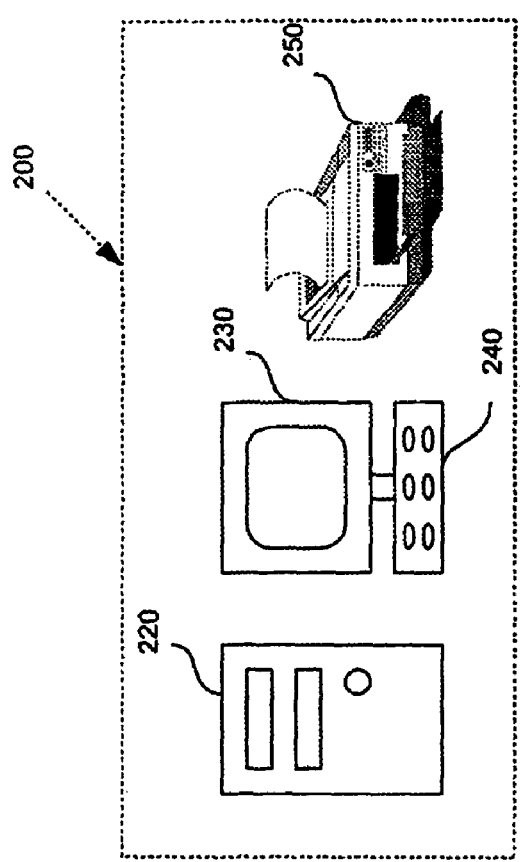
FIG. 2 is a diagrammatical representation of a computer system for use in implementing the animal feed formulation method described in FIG. 1.

FIG. 2 illustrates a computer system 200 that can be used to calculate an animal feed having an optimized nucleic acid material content. Computer system 200 can include a processor 210, a memory 220, a visual display unit 230, an input device 240, and an output device 250.

Computer system 200 can be any type of computing device, including work stations, laptops, notebooks, personal digital assistants (PDAs), or other equipment capable of receiving input from input device 240, accessing memory 220, executing a series of instructions and providing an output to visual display unit 230 or output device 250. Processor 220 can be any type of processor capable of executing instructions, such as an Intel® PENTIUM® processor sold by Intel Corp. of Santa Clara, Calif. Visual display unit 230 can be any type of visual display, such as a CRT tube monitor or an LCD display screen. Input device 240 can be a keyboard, a touchpad, voice recognition, file transfer, or any other method or apparatus for communicating information to standalone computing system 200. Output device 250 can be a laser printer, a dot matrix printer, an email program, or any other method or apparatus of communicating information from standalone computing system 400.

According to an exemplary embodiment, a customer seeking a formulation for an animal feed having an optimized nucleic acid material content can utilize the methods described with reference to FIG. 1 using computer system 200. The customer can use input device 240 to provide necessary inputs. Computing system 200 can be used to implement an animal feed formulation system in which processor 220 can receive the inputs, access memory 220 for additional required information, and perform necessary calculations. The results of the analysis can be provided alternatively on visual display unit 230 or output device 250.

Figure 3:
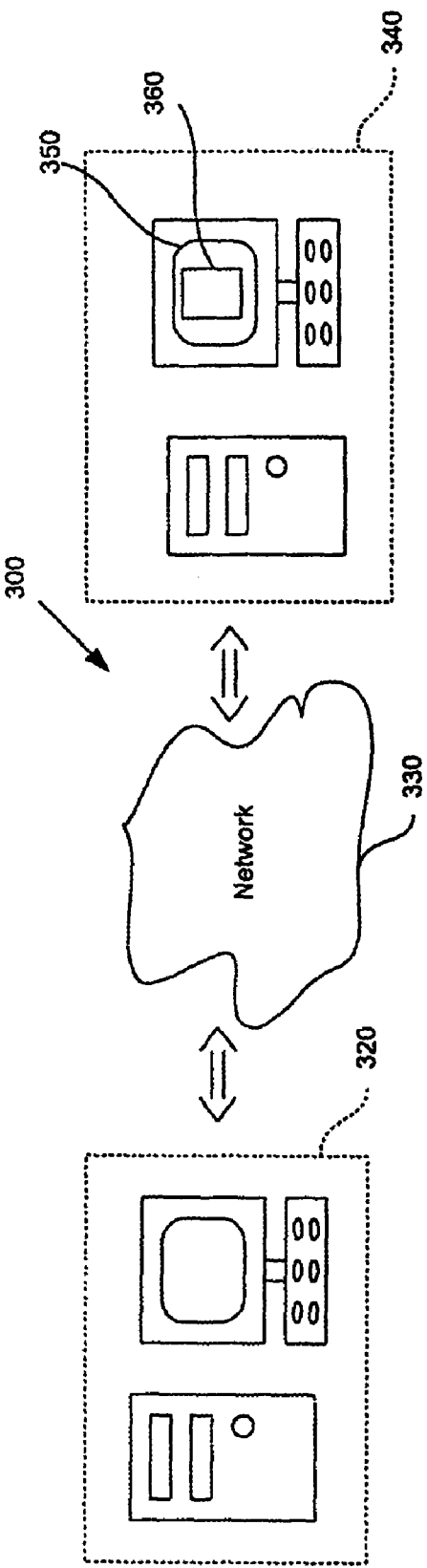
FIG. 3 is a diagrammaticial representation of multiple computers in a networked configuration.

FIG. 3 illustrates a system 300 for providing an animal feed formulation having a customized nucleic acid material content in a network environment. System 300 can include a first computing system 320, a computer network 330, and a second computing system 340. Second computing system 340 further includes a web browsing application 350 capable of displaying a web page 360 provided by first computing system 320.

First computing system 320 and second computing system 340 can be any type of computer system, such as standalone computing system 200, discussed in reference to FIG. 2. Computing system 320 and second computing system 340 further include devices for communicating over network 330.

According to an exemplary embodiment, network 330 is the Internet, a worldwide network of computer networks that use various protocols to facilitate data transmission and exchange. Network 330 can use a protocol, such as the TCP/IP network protocol or the DECnet, X.25, and UDP protocols. According to alternative embodiments, network 330 can be any type of network, such as a virtual private network (VPN), an Ethernet, or a Netware network. Further, network 330 can include a configurations such as, a wide area network (WAN) or a local area network (LAN). Network 330 preferably provides communication with a Hypertext Markup Language (HTML).

Web browsing application 350 can be any type of application capable of accessing information stored on other computing systems over network 330. Examples can include applications such as Internet Explorer sold by Microsoft Corporation of Redmond, Wash. or Netscape sold by Netscape Communications Inc. of Mountain View, Calif. According to an exemplary embodiment, web browsing application 350 can be used to access first computing system 320, to receive data, and to display web page 360.

According to an exemplary embodiment, a customer seeking to utilize system 300 to obtain an animal feed formulation having a customized nucleic acid material content can access second computing system 340 and run web browsing application 350. Web browsing application 350 can be directed to retrieve web page 360 from first computing system 320 over network 330.

Once retrieved, web page 360 can be used by the customer to provide necessary inputs. The necessary input can include the animal data, available feed ingredients, and evaluation criteria as described with reference to FIG. 1. First computing system can receive the inputs.

Based on the inputs, first computing system 200 can gather necessary data related to the inputs. Examples could include an idealized nutrient profile for the animal described in the animal data, the nutrient profile for the available ingredients listed, etc. Gathering necessary data can include accessing stored values available locally or over the network.

The data can then be utilized as input to a linear math program, described with reference to FIG. 1, to generate an animal feed formulation. First computing system 320 can then transfer the animal feed formulation to second computing system 340 over network 330 for display on web page 360.

Although ingredients naturally contain levels of nucleic acid materials, it may be advantageous to utilize an ingredient that has a relatively higher concentration of nucleic acid material. Ingredients that contain genetic material derived from either cell nuclei or ribosomal DNA or RNA can contain nucleic acid material concentrations. Tissues with a relative high DNA and RNA to cell dry matter ratio can include a relatively higher concentration of nucleic acid materials. Some processing methods may increase nucleic acid material concentration by preferential separation of non-nucleic acid material compounds out of the final feed ingredient.

According to an exemplary embodiment, the starting material for the animal feed ingredient can be a byproduct of heparin production. Heparin is an organic compound including a mixture of complex carbohydrate molecules called mucopolysaccharides. It functions as a short-term anticoagulant used to prevent thrombosis during and after surgery and for initial treatment of various heart, lung, or circulatory disorders in which there is an increased risk of blood clotting. The byproducts of heparin production can be formed into an animal feed ingredient having a high nucleic acid material content.

Advantageously, a single ingredient with a high nucleic acid material content allows the producer greater flexibility to satisfy other evaluation criteria in addition to nucleic acid material levels. It can also provide a cost benefit in reducing the mass of material, possibly having surplus nutrients, that must be utilized to meet nucleic acid material requirements.

Additionally, an ingredient having a high nucleic acid material content can provide high levels of nucleic acid material with less bulk. This advantage can be important if the animal has reduced consumption caused by weaning or illness.

While the exemplary method described above yields a product with a high nucleic acid material content, any ingredient can be used to modify the nucleic acid material content of an animal feed. The ingredients can be naturally occurring or produced as a result of a processing method.

Further, while the exemplary embodiments illustrated in the figures and described above are presently preferred, it should be understood that these embodiments are offered by way of example only. Other examples may include, for example, a wide variety of ways to convey information regarding animal information or formulations having a customized nucleic acid material content such as, wireless application protocol (WAP), personal digital assistant (PDA) protocols, and other presentation means. Further, while exemplary embodiments describe the invention in the context of livestock feed, the invention may extend to other types of animal feed in which a customized nucleic acid material content is advantageous. Additionally, specific information is described above as coming from specific sources for use in the system and method, but any information that is relevant, from any source, can be used in the calculations. The invention is not limited to a particular embodiment, but extends to various modifications, combinations, and permutations that nevertheless fall within the scope and spirit of the appended claims.

What is claimed is:

1. A method for determining customized feed for at least one animal, the method comprising:
    receiving animal data representative of the characteristics of the animal;
    receiving feed data representative of feed ingredients;
    generating nutritional profile data representative of a desirable nucleic acid material content for the animal based upon the animal data; and
    generating formulation data including data representative of a combination of feed ingredients, the formulation data being generated based upon the nutritional profile data and the feed data.

2. The method of claim 1, wherein generating the nutritional profile data includes determining a level of nucleic acid material that optimizes a criteria based upon the animal data.

3. The method of claim 2, wherein the nutritional profile data includes data representative of at least one nutrient component.

4. The method of claim 1, wherein the nutritional profile data is representative of at least two nutrient components, and wherein the formulation data is generated further based upon variation data representative of a range of levels for nucleic acid materials for at least one of the at least two nutrient components.

5. The method of claim 1, wherein the feed ingredients include at least one of a carbohydrate source, a protein source, a fat source, a vitamin source, a mineral source and a nucleic acid material source.

6. A method for determining customized feed for at least one animal, the method comprising:
    receiving animal data representative of the characteristics of the animal;
    receiving feed data representative of feed ingredients;
    receiving evaluation data representative of at least one evaluation criteria;
    generating nutritional profile data representative of a desirable nucleic acid material content for the animal based upon the animal data; and
    generating formulation data including data representative of a combination of feed ingredients, the formulation data being generated based upon the nutritional profile data, the feed data and the evaluation data.

7. The method of claim 6, wherein generating the nutritional profile data includes determining a level of nucleic acid material that optimizes a criteria based upon the animal data.

8. The method of claim 7, wherein the evaluation criteria includes at least two criteria.

9. The method of claim 8, wherein the evaluation criteria include an associated optimization weighting data, the method further comprising the step of generating the formulation data based on the optimization weighting data.

10. The method of claim 7, wherein the nutritional profile data includes data representative of at least one nutrient component.

11. The method of claim 6, wherein the nutritional profile data is representative of at least two nutrient components, and wherein the formulation data is generated further based upon variation data representative of a range of levels for nucleic acid materials for at least one of the at least two nutrient components.

12. The method of claim 6, wherein the feed ingredients include at least one of a carbohydrate source, a protein source, a fat source, a vitamin source, a mineral source and a nucleic acid material source.

13. A method for optimizing the growth rate of an animal, the method comprising:
    receiving animal data representative of the characteristics of the animal;
    receiving feed data representative of feed ingredients;
    receiving evaluation data representative of at least one evaluation criteria;
    generating nutritional profile data including a data representative of a desirable nucleic acid material content for the animal based upon the animal data; and
    generating formulation data representative of a combination of feed ingredients, the formulation data being generated based upon the nutritional profile data, the feed data and the evaluation data;
    wherein the evaluation criteria include an optimized animal growth rate.

14. The method of claim 13, wherein generating the nutritional profile data includes determining a level of nucleic acid material that optimizes a criteria based upon the animal data.

15. The method of claim 14, wherein the evaluation criteria includes at least two criteria.

16. The method of claim 15, wherein the evaluation criteria include an associated optimization weighting data, the method further comprising the step of generating the formulation data based on the optimization weighting data.

17. The method of claim 14, wherein the nutritional profile includes data representative of at least one nutrient component.

18. The method of claim 13, wherein the nutritional profile data is representative of at least two nutrient components, and wherein the formulation data is generated further based upon variation data representative of a range of levels for nucleic acid materials for at least two nutrient components.

19. The method of claim 13, wherein the feed ingredients include at least one of a carbohydrate source, a protein source, a fat source, a vitamin source, a mineral source and a nucleic acid material source.

20. The method of claim 13, wherein the animal is newly weaned.

21. The method of claim 14, wherein the animal is intestinally challenged.

22. The method of claim 14, wherein the formulation data is used to create an animal feed having a customized nucleic acid material content.

23. The method of claim 22, wherein the method is utilized in production of a food product from an animal fed the animal feed.

* * * * *